US007927063B2

(12) United States Patent
Keenan et al.

(10) Patent No.: US 7,927,063 B2
(45) Date of Patent: Apr. 19, 2011

(54) METHOD FOR MOUNTING A FORKLIFT TO A VEHICLE

(75) Inventors: Patrick Keenan, Atlanta, GA (US); Kevin Turnbull, Dundalk (IE); Barry McGrane, Clogherhead (IE)

(73) Assignee: Moffett Research & Development Limited, Dundalk (IE)

( * ) Notice: Subject to any disclaimer, the term of this patent is extended or adjusted under 35 U.S.C. 154(b) by 403 days.

(21) Appl. No.: 12/126,083

(22) Filed: May 23, 2008

(65) Prior Publication Data

US 2008/0292448 A1 Nov. 27, 2008

Related U.S. Application Data

(60) Provisional application No. 60/939,759, filed on May 23, 2007.

(51) Int. Cl.
*B60P 3/06* (2006.01)
(52) U.S. Cl. ........................................ 414/812; 414/467
(58) Field of Classification Search .................. 414/467, 414/812
See application file for complete search history.

(56) References Cited

U.S. PATENT DOCUMENTS 3,390,797 A * 7/1968 Goodacre et al. ............. 414/467
3,407,950 A 10/1968 Ward et al.
3,710,965 A * 1/1973 Joosten ......................... 414/467
(Continued)

FOREIGN PATENT DOCUMENTS

EP 0241827 A2 10/1987
(Continued)

OTHER PUBLICATIONS

Photograph and two drawings of a mounting hook. (believed to have been offered for sale, publicly used, and/or published prior to the filing date of this application).

*Primary Examiner* — James Keenan
(74) *Attorney, Agent, or Firm* — Gifford, Krass, Sprinkle, Anderson & Citkowski, P.C.; Douglas L. Wathen

(57) ABSTRACT

Disclosed is a method for mounting a forklift to the rear of a vehicle such as a truck or trailer. The method includes providing a forklift in a vehicle, the forklift having a frame, a pair of spaced apart front wheels and at least one rear wheel. The forklift also has a pair of forks that are movably mounted to the frame, the pair of forks movable in at least a vertical direction relative to the frame. The vehicle has a rearward end with a fork support that receives the pair of forks of the forklift. The mounting system includes a pair of mounting brackets, each of the mounting brackets being fixedly attached to the forklift frame or the rearward end of the vehicle and having an opening defined therethrough. The opening has a closed perimeter. Also included is a pair of receiving pins, the receiving pins being dimensioned such that they can slide through the opening in each of the mounting brackets. The receiving pins have a supporting position and a release position. The supporting position of the pins results in a horizontal disposition thereof and rigid attachment of the forklift to the rearward end of the vehicle. Mounting of the forklift to the rearward end of the vehicle is afforded when the openings of the mounting brackets are in alignment with the supporting position of the pins and the pins are in the supporting position while being located through the openings of the mounting brackets.

19 Claims, 13 Drawing Sheets

U.S. PATENT DOCUMENTS

| | | | | |
|---|---|---|---|---|
| 3,799,379 | A | 3/1974 | Grether et al. | |
| 4,180,363 | A | 12/1979 | Steiger et al. | |
| 4,266,795 | A | 5/1981 | Walker | |
| 4,365,921 | A | 12/1982 | Brouwer et al. | |
| 4,396,341 | A | 8/1983 | Brouwer et al. | |
| 4,921,075 | A | 5/1990 | Schumacher et al. | |
| 5,174,415 | A | 12/1992 | Neagle et al. | |
| 5,370,494 | A | 12/1994 | Holmes et al. | |
| 5,549,437 | A | 8/1996 | Kishi | |
| 5,575,604 | A | 11/1996 | Dubosh et al. | |
| 5,651,658 | A | 7/1997 | Holmes et al. | |
| 5,749,695 | A | 5/1998 | Moffett et al. | |
| 5,813,820 | A | 9/1998 | Dubosh et al. | |
| 5,876,175 | A * | 3/1999 | Braud | 414/467 |
| 6,024,535 | A | 2/2000 | Dubosh et al. | |
| 6,062,800 | A | 5/2000 | Perry et al. | |
| 6,116,843 | A | 9/2000 | Braud et al. | |
| 6,120,232 | A | 9/2000 | Dubosh et al. | |
| 6,530,739 | B1 | 3/2003 | Fridman | |
| 6,572,322 | B2 * | 6/2003 | Karr | 414/462 |
| 2002/0057959 | A1 | 5/2002 | Karr | |

FOREIGN PATENT DOCUMENTS

| | | | |
|---|---|---|---|
| EP | 0571240 | A1 | 11/1993 |
| GB | 1448653 | | 9/1976 |
| GB | 2259292 | | 3/1993 |
| GB | 2287237 | | 9/1995 |

* cited by examiner

METHOD FOR MOUNTING A FORKLIFT TO A VEHICLE

CROSS-REFERENCE TO RELATED APPLICATIONS

This application claims priority of U.S. Provisional Patent Application Ser. No. 60/939,759 filed May 23, 2007, the entire content of which is incorporated herein by reference.

FIELD OF THE INVENTION

The present invention relates generally to a method for mounting a forklift to the rear of a vehicle such as a truck or trailer.

BACKGROUND OF THE INVENTION

Forklifts of various kinds are well known in the art. Typically, forklifts include a maneuverable vehicle portion with a pair of forks mounted to a mast mechanism on the vehicle portion. The vehicle portion and the forks cooperate to pick up, maneuver, and set down loads. Traditional forklifts are rather large and heavy vehicles that are designed to be used in one area, such as a warehouse, and not to be transported from site to site. More recently, more maneuverable three wheel forklifts have been developed that are designed to be mounted and transported on a truck. Examples of such forklifts are shown in UK Patent Application GB 2,259,292A and U.S. Pat. No. 4,921,075 to Schumacher et al. This type of forklift has a pair of front wheels or tires and a single rear steering wheel. The forklift mechanism is generally positioned between the front wheels or tires. These types of forklifts are typically shorter, front to back, than traditional forklifts and their use of a single rear steering wheel makes them highly maneuverable. Also, they are designed to mount on the rear of a vehicle such as a truck or trailer for transport with the vehicle.

FIG. 1 provides an illustration of an exemplary three wheel forklift of the type discussed above. The forklift 2 includes a forklift frame 3 which is in turn supported by ground contacting wheels or tires 4. The front tires 4 are shown in FIG. 1. A third generally centrally mounted rear tire is also included, though not visible in FIG. 1. The forklift frame 3 supports an operator cab or operator location 5 where an operator normally resides to operate the various controls of the forklift 2. The forklift 2 includes a pair of forks 6 which are movable upwardly and downwardly relative to the frame 3. The forks 6 are supported by a mast 7 which in turn is connected to the frame 3. In addition to vertical movement of the forks, the forklift 2 also includes the ability to move the forks longitudinally fore and aft relative to the frame 3. This allows the forklift to "reach" forward to pick up or deposit a load. The longitudinal movement of the forks 6 relative to the frame 3 may be accomplished by longitudinal movement of the mast 7 relative to the frame 3 or by movement of the forks 6 or a fork support structure relative to a static mast. The forks 6 and/or mast 7 may also be tilted relative to the frame 3. In some models, the forks 6 may also be moved side to side relative to the frame and/or each other.

U.S. Pat. No. 5,575,604 to Dubosh et al. and U.S. Pat. No. 5,749,695 to Moffett et al. both show mounting systems for the newer type of three wheel forklift. In each case, a pair of fork tine receiving slots is provided in the rear of a vehicle and interconnects with the vehicle's frame. To mount the forklift to the rear of the frame, the forklift driver approaches the truck with the forks aligned with the receiving slots. The slots are a distance above the ground or surface on which the forklift and the vehicle are supported. The forklift operator inserts the forks into the slots until the body of the forklift is close to the back of the vehicle. At this point, the forks are inserted a significant distance into the slots. The operator then lowers the forks with respect to the body and/or frame of the forklift. Because the forks are inserted in the slots, this action lifts the forklift off the ground such that the forklift is supported by its forks in the slots. In this way, the forklift is "piggybacked" on the rear end of the vehicle with the mounting system.

Preferably, the mounting system also includes additional support for the forklift so that the entire force of supporting the forklift is not passed through the forks. For example, in the Moffett et al. patent, a pair of wheel rests is provided on the rear of the vehicle aligned with the front wheels on the forklift. After lifting the forklift off the ground by its forks, the operator hydraulically retracts the forks towards the forklift, thereby pulling the body of the forklift towards the rear of the vehicle. In this way, the user positions the front wheels on top of the wheel rests and then lowers the forklift body until the wheel rests are supporting a significant portion of the load of the forklift. Chains or other supports may also be provided for interconnecting the body of the forklift with the vehicle.

In the Dubosh et al. patent, a pair of hooks with upwardly directed openings are provided on the rear of the vehicle and corresponding fixed horizontal members are provided on the front of the forklift frame. The forklift is loaded onto the vehicle by inserting the forks into fork supports, lifting the forklift upwardly until the horizontal members are higher than the hooks, retracting the forks towards the forklift to move the horizontal members to a position directly above the hooks, and then lowering the forklift until the horizontal members engage the hooks and the forklift is supported. Wheel abutments are also provided on the vehicle and are engaged by the wheels of the forklift when the forklift is attached to the vehicle. The abutments are generally vertical members that engage the fronts of the wheels.

FIG. 2 illustrates a detailed view of a mounting system utilizing a hook 60 mounted to a frame 62 of a forklift that engages a horizontal member 64 that is attached to the rear of a vehicle 66. The forklift may be mounted to the vehicle using the same series of steps described above. However, as will be clear to those of skill in the art, the design discussed above and shown in FIG. 2 both require the forklift to be lifted upwardly and then moved forwardly in order to engage the hook and horizontal member with one another. This typically requires that an operator remain in the operator location as the forklift is lifted, moved forwardly and then engaged with the mounting system. The operator then must climb down from the elevated forklift to the ground. Removing the forklift from the vehicle requires an operator to perform the same operations in reverse. The operator must climb into the operator location in the elevated forklift and then operate the controls to lift the forklift so as to disengage the mounting system, move the forklift rearwardly to clear the hook and horizontal member from one another, and then lower the forklift until it is supported by the ground. Some or all of these operations may be time consuming, unsafe and/or uncomfortable for an operator since it requires climbing into a forklift that is supported above the ground.

SUMMARY OF THE INVENTION

Disclosed is an improved method for mounting a forklift to the rear of a vehicle such as a truck or trailer. The method includes providing a forklift in a vehicle, the forklift having a frame, a pair of spaced apart front wheels and at least one rear wheel. The forklift also has a pair of forks that are movably mounted to the frame, the pair of forks movable in at least a vertical direction relative to the frame. The vehicle has a rearward end with a fork support that receives the pair of forks of the forklift. The method also includes providing a pair of mounting brackets, each of the mounting brackets being fixedly attached to the forklift frame or the rearward end of the vehicle and having an opening defined therethrough. The opening has a closed perimeter. Also provided is a pair of receiving pins, the receiving pins being dimensioned such that they can slide through the opening in each of the mounting brackets. The receiving pins have a supporting position and a release position. The supporting position of the pins results in a horizontal disposition thereof and rigid attachment of the forklift to the rearward end of the vehicle. It is appreciated that if the mounting brackets are fixedly attached to the forklift frame, then the receiving pins are afforded rigid attachment to the rearward end of the vehicle. In the alternative, if the mounting brackets are fixedly attached to the forklift frame, then the receiving pins are afforded rigid attachment to the forklift frame. The release position results from the receiving pins being removed from the supporting position and the termination of the rigid attachment of the forklift to the rearward end of the vehicle. Mounting of the forklift to the rearward end of the vehicle is afforded when the openings of the mounting brackets are in alignment with the supporting position of the pins and the pins are in the supporting position while being located through the openings of the mounting brackets.

In some instances, the openings in the mounting brackets are noncircular and can have an upper edge with a width that is less than a lower edge. In other instances, the method system can provide an auxiliary controller, the auxiliary controller being a wireless remote controller or a wired remote controller. The remote controller is operable to operate the operator controls of the forklift remotely. In addition, a secondary ignition switch can be located on an external surface of the forklift, the secondary ignition switch operable to start or terminate an engine of the forklift by an operator standing beside the forklift and not located within an operator location or cab. The starting of the engine of the forklift can provide power to a hydraulic system that is operable to move the forks of the forklift.

DETAILED DESCRIPTION OF THE INVENTION

The present invention provides a method for mounting a forklift to the rear of a vehicle such as truck or trailer. As such, the method has utility for providing safety and convenience to a forklift operator.

Figure 1:
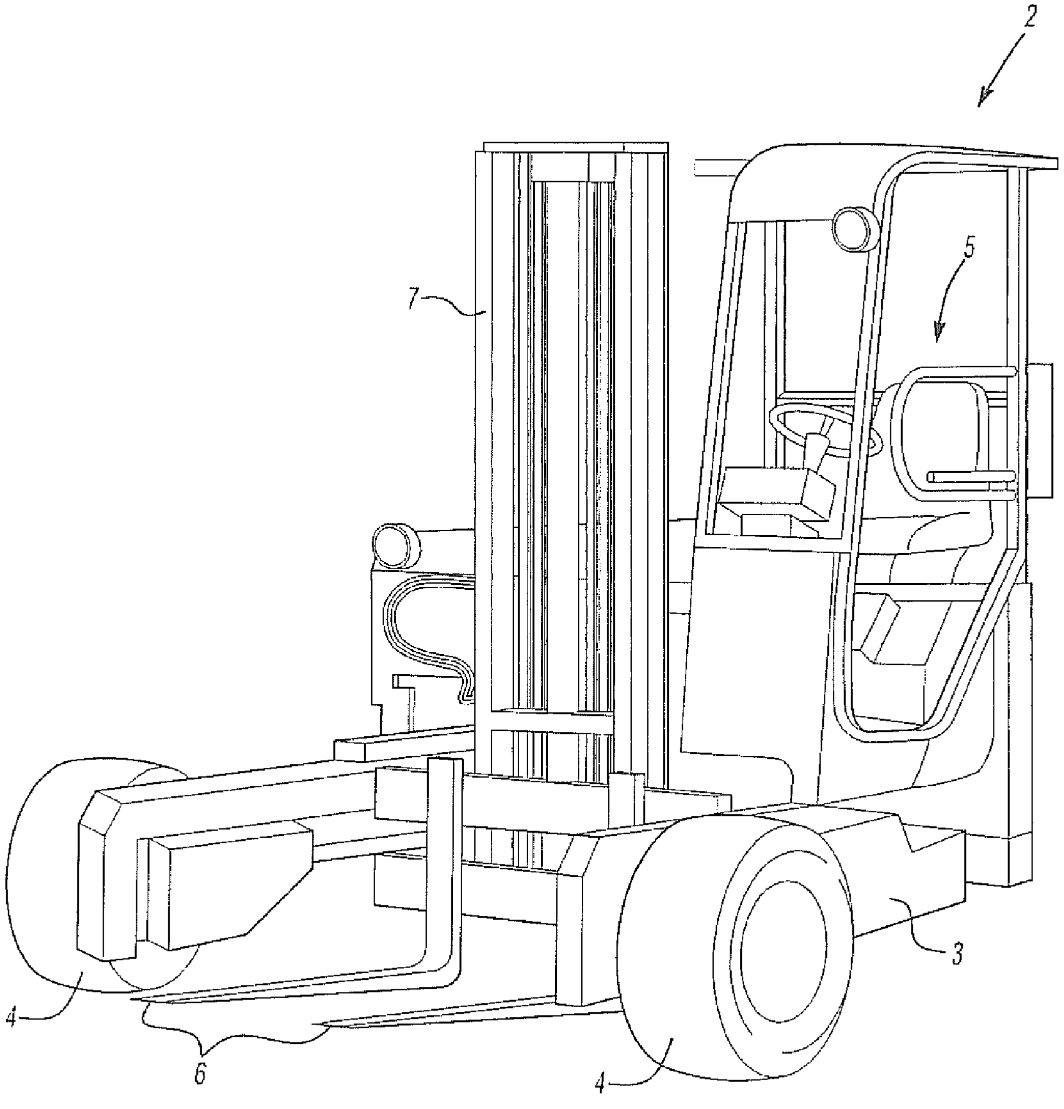
Fig-1 PRIOR ART
FIG. 1 is a schematic view of a forklift.
Figure 2:
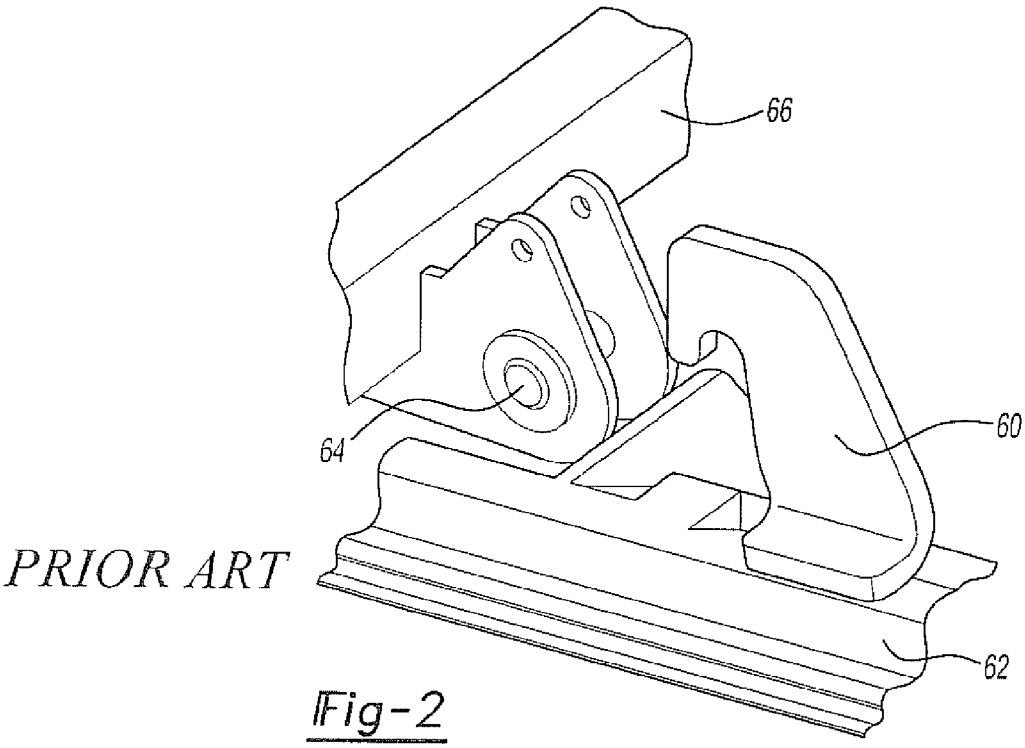
FIG. 2 is a schematic view of a prior art method for mounting a forklift onto a rearward end of a vehicle.
Figure 3:
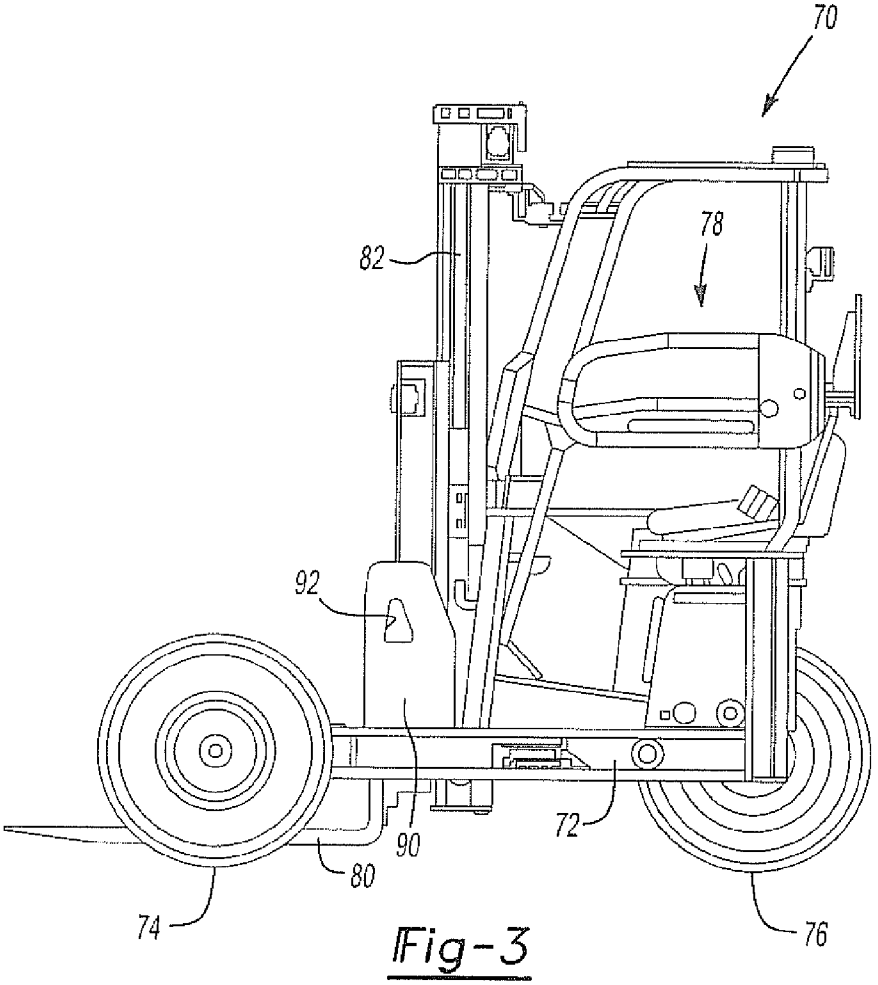
FIG. 3 is a side view of a forklift.

Turning now to FIG. 3, a forklift 70 that includes a forklift frame 72 supported by a pair of front wheels 74 and a single rear wheel 76, which also provides steering is shown. An operator cab is supported by the frame 72 and defines an operator location 78. During normal operation, an operator resides in the operator location 78 and manipulates a variety of controls known to one skilled in the art in order to operate the forklift 70. The forklift 70 also includes a pair of forks 80 which are movable vertically relative to the forklift frame 72. In the embodiment illustrated in FIG. 3, the forks 80 are interconnected with the frame 72 by a mast 82. The forklift 70 includes a hydraulic system (not shown) for moving the forks 80 upwardly and downwardly, for tilting the mast 82 and for performing or powering other operations known to those in the art. Preferably, the forklift 70 also provides for longitudinal movement of the forks 80 forwardly and rearwardly with respect to the frame 72 with the hydraulic system powering the longitudinal movement of the forks 80 relative to the frame 72. The forklift 70 also includes an engine for providing power to one or more of the ground contacting wheels 74 and 76 and the hydraulic system includes an engine driven pump for energizing the hydraulic system. In order to provide full power to the hydraulic system, the engine of the forklift must be running. However, in some embodiments an auxiliary hydraulic pump is provided that is operable to provide limited energizing of the hydraulic system. This auxiliary system is typically an electrically driven pump that can be used to provide small movements of the hydraulic system without the engine running.

Figure 4:
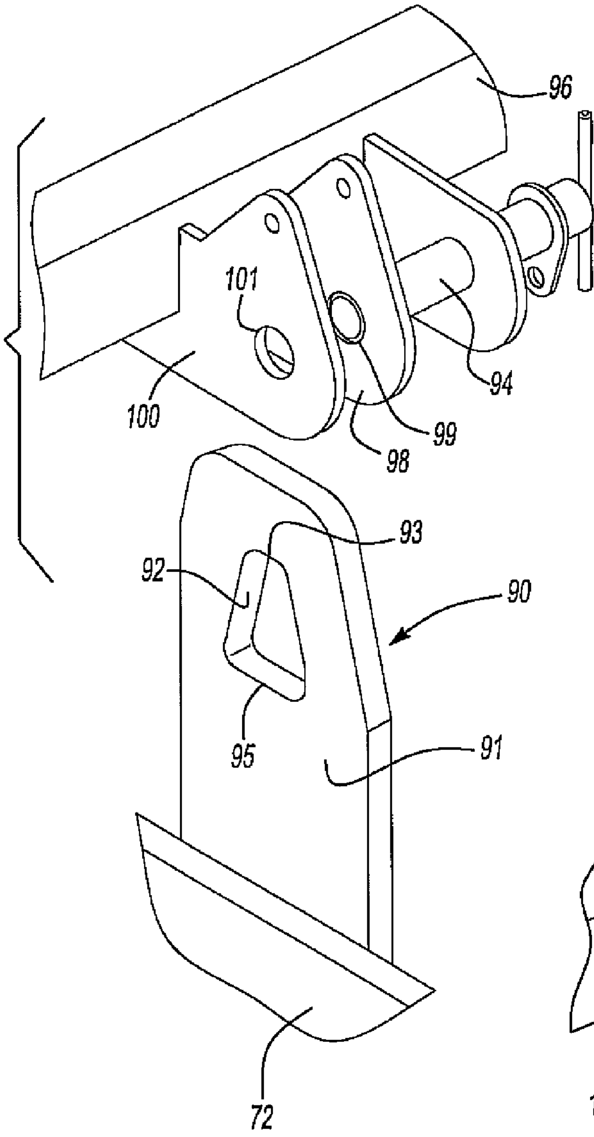
FIG. 4 is a perspective view of an embodiment of the present invention illustrating a pin in a release position.
Figure 5:
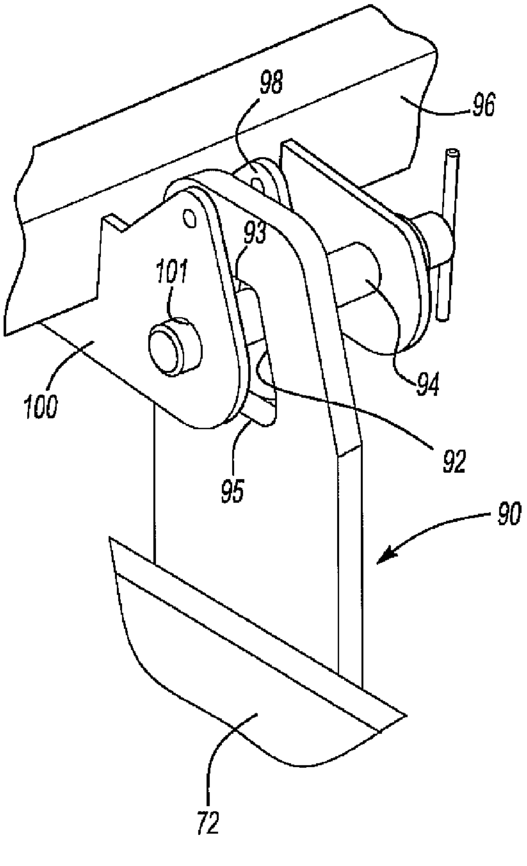
FIG. 5 is a perspective view of the embodiment shown in FIG. 4 illustrating the pin in a supporting position.

The method according to an embodiment of the present invention includes providing a pair of mounting brackets mounted to the forklift or vehicle and a pair of receiving pins or members that are mounted to the other of the vehicle or forklift. In the illustrated embodiment, a mounting bracket 90 is fixedly connected to the forklift frame 72. A detailed view is shown in FIG. 4. The mounting bracket 90 can take the form of a metal flange 91 that extends upwardly from the frame 72. In this embodiment, the flange is generally planar and extends vertically in a plane generally parallel to the vertical direction of travel of the forks 80. An opening 92 is defined through the bracket 90. The opening 92 has a closed perimeter. In other words, the bracket does not form a hook with an opening to the front or rear but instead only has openings to the two sides of the metal flange 91 and has an upper edge 93 and a lower edge 95. In this embodiment, a pair of spaced apart receiving pins 94, only one of which is shown in FIG. 4, can be mounted to the rear of a vehicle 96. In the illustrated version, the pins 94 have a supporting position wherein they extend in a generally horizontal disposition through a pair of apertures 99 and 101 that are within a pair of flanges 98 and 100, respectively. It is appreciated that flanges 98 and 100 can be attached to and extend from the rear of the vehicle 96. In FIG. 4, the pin 94 is shown in a retracted or released position wherein the space between the flanges 98 and 100 is left clear to receive the bracket 90, whereas in FIG. 5 the pin 94 is shown in the supporting position with the pin 94 rigidly attached to the rear of the vehicle 96 and the bracket 90 also attached to the rear of the vehicle by the pin 94 passing through aperture 99, opening 92 and aperture 101. It is appreciated that the forklift 70, being attached to the bracket 90, is likewise attached to the rear of the vehicle 96.

Figure 6:
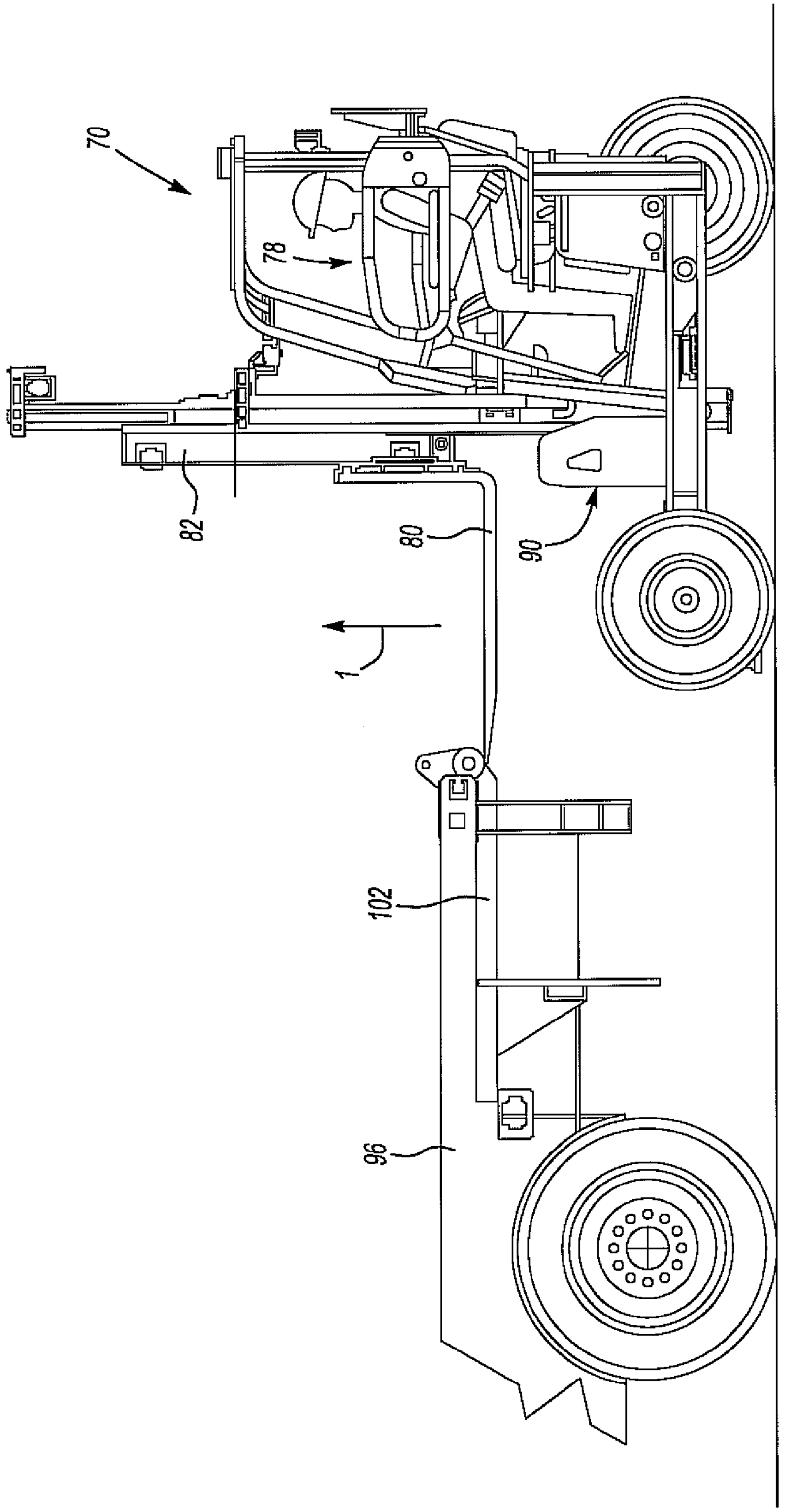
FIG. 6 is a side view of a forklift at a location adjacent to a rearward end of a vehicle with the forks aligned with a fork support.

Referring now to FIGS. 6-11, an embodiment of a method for mounting a forklift to a vehicle and an illustration of a mounting system will be described. In FIG. 6 a forklift 70 is provided and is shown positioned behind the vehicle 96 with the forks 80, attached to the mast 82, moved in a generally upward direction 1 such that they are aligned with a fork support 102 that is rigidly attached to the vehicle 96. The fork support 102 may take a variety of forms, including fork pockets that extend longitudinally and are shaped to receive the forks 80. In another design, the fork support 102 can take the form of transverse structural members that are disposed above and below the forks 80 once they are advanced into the back of the vehicle 96. The operator is in the operator location 78.

Figure 7:
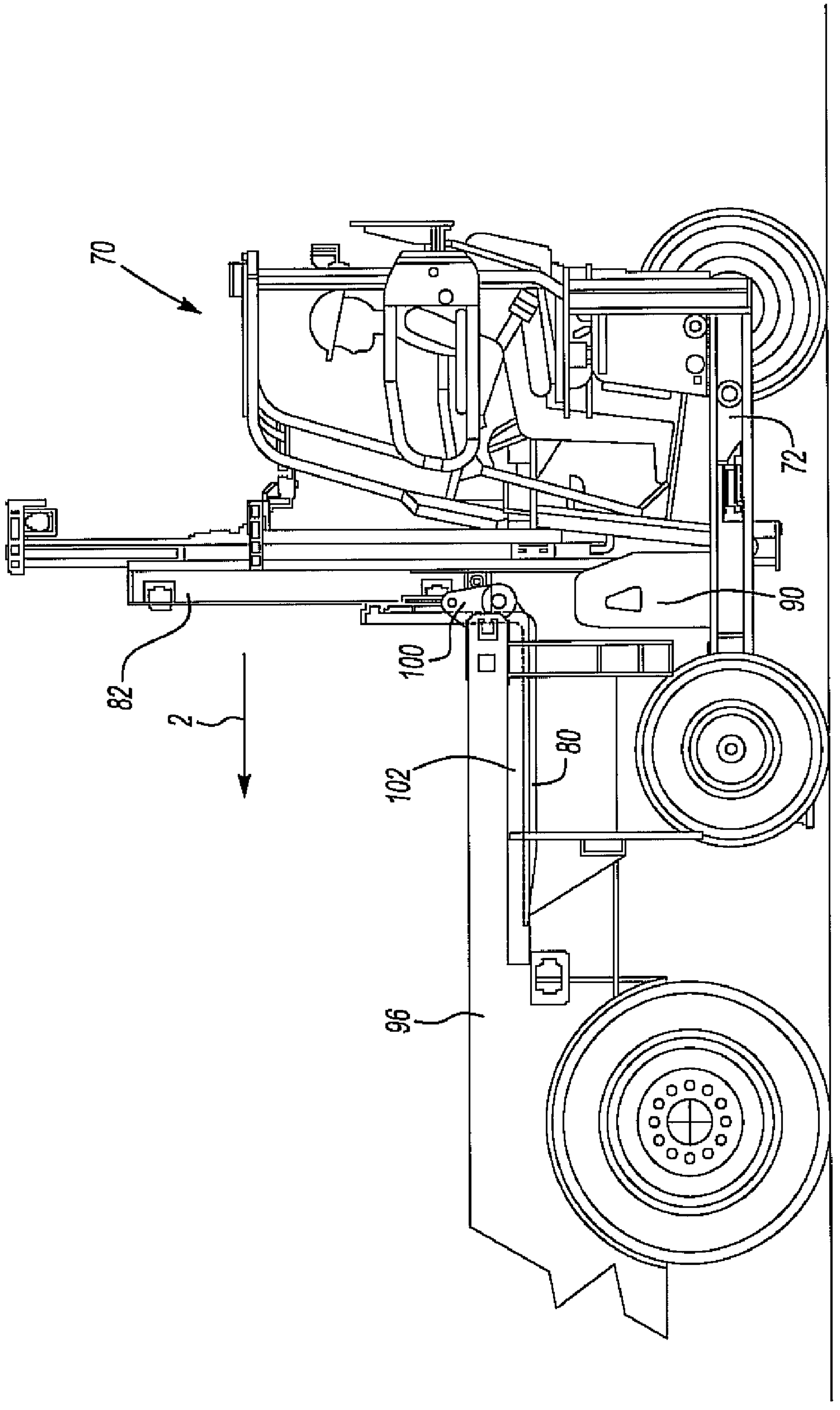
FIG. 7 is a side view of the forklift shown in FIG. 6 with the forks inserted into the fork support.
Figure 8:
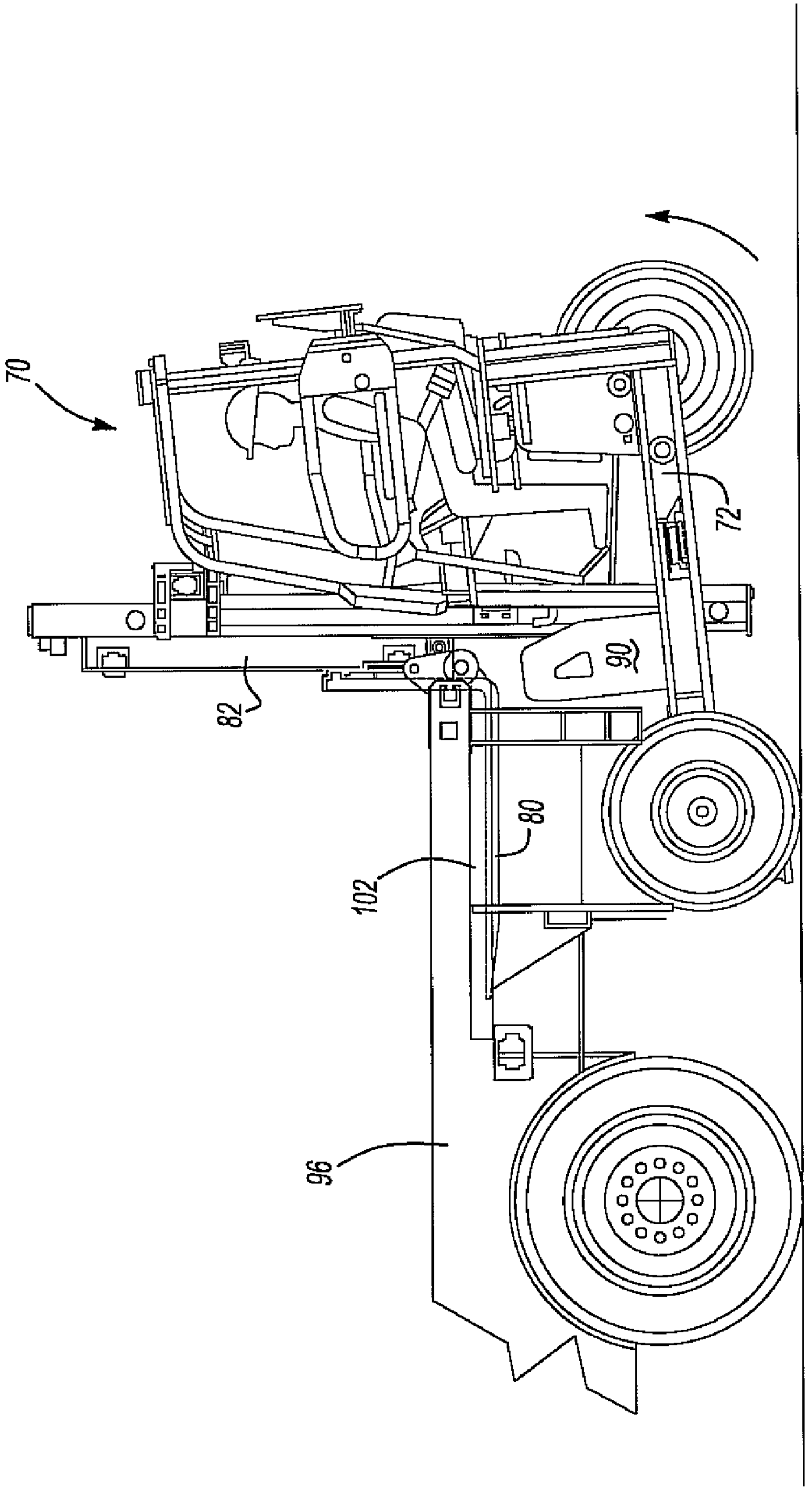
FIG. 8 is a side view of the forklift shown in FIG. 7 with its forks inserted into the fork support on the motor vehicle and the forklift being lifted upwardly.
Figure 9:
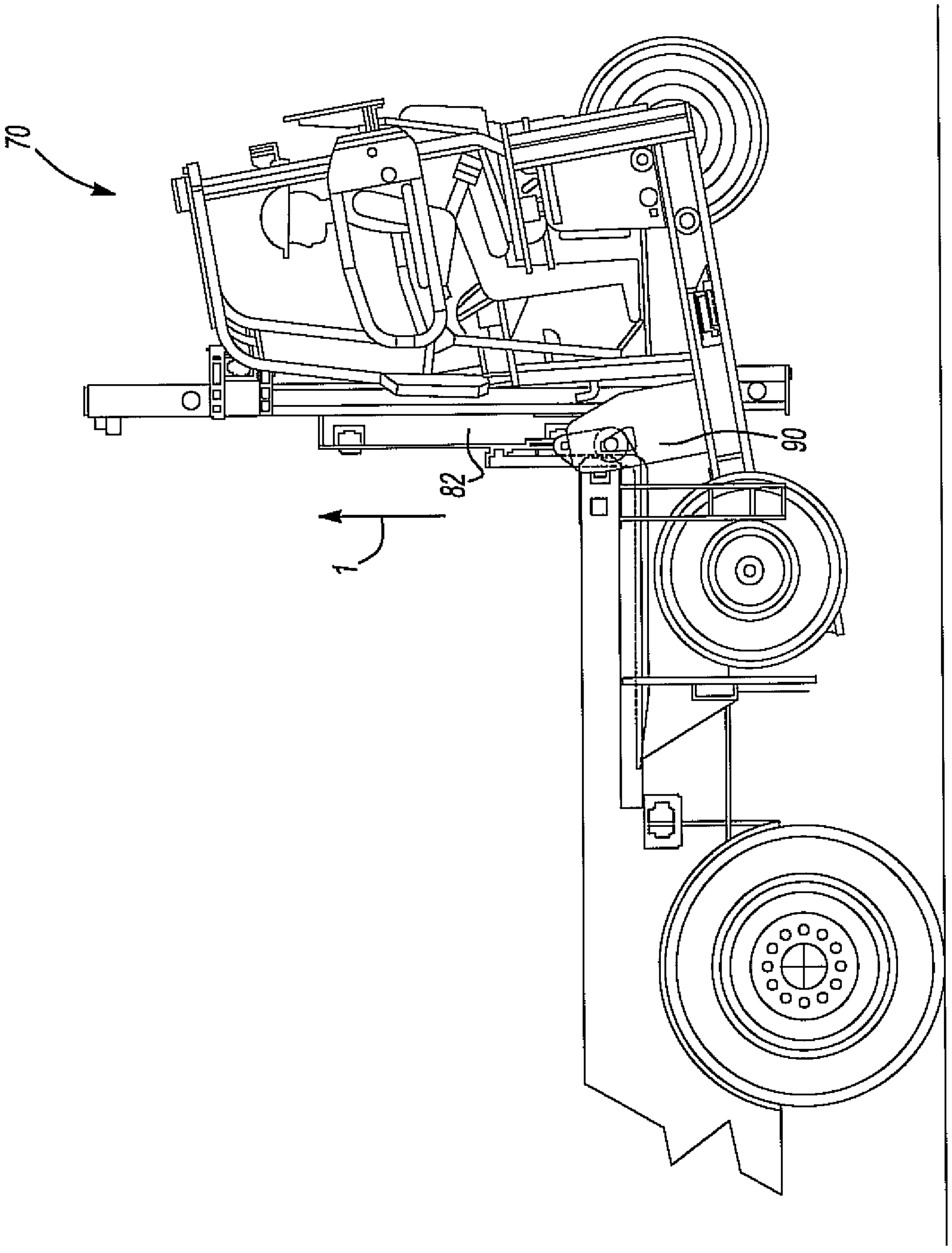
FIG. 9 is a side view of the forklift shown in FIG. 8 in an elevated position.

In FIG. 7 the operator has moved the forklift 70 longitudinally towards the back of the vehicle 96 in a forward direction 2 until the forklift 70 reaches a predetermined position adjacent the rear of the vehicle 96. In some embodiments, this is a position with the forks 80 completely inserted into the fork support 102. As shown, the forklift 70 in FIGS. 6 and 7 has the mast 82 and forks 80 retracted rearwardly to a rearmost position such that when the forklift 70 reaches the position shown in FIG. 7, the forklift frame 72 is as far forward as possible. This preferably positions the mounting brackets 90 directly below a position or a plurality of possible positions in which the receiving pins 94 reside when in their supporting position. In FIG. 8, the operator lifts the forklift upwardly by lowering the forks 80 relative to the frame 72. This typically causes the forklift to tilt somewhat forward so that the rear wheel is lifted first. In FIG. 9, the forklift 70 is lifted in the generally upwardly direction 1 until the openings 92 in the brackets 90 align with the supporting position of the pins 94. If necessary, the forklift 70 may be moved farther forward in direction 2 so as to align the openings 92 with the apertures 99 and 101 such that the pins 94 can be placed therethrough. The pins 94 are then inserted through the openings 92 as shown in FIG. 10A and the operator can then deenergize the hydraulic system and/or lower the forklift 70 such that the weight of the forklift 70 is supported mainly by the mounting system consisting of the mounting brackets 92, 98, 100 and pins 94.

Figure 10:
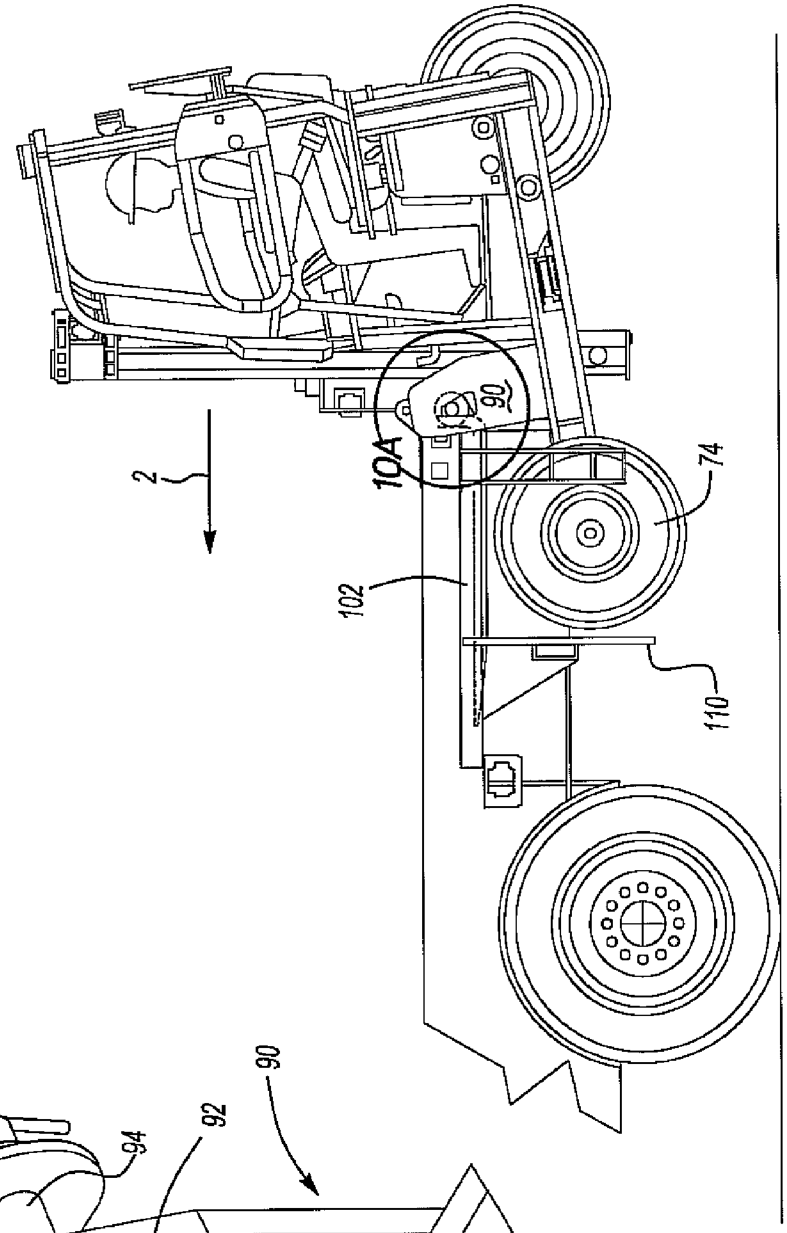
FIG. 10 is a side view of the forklift shown in FIG. 8 in an elevated position.
Figure 10A:
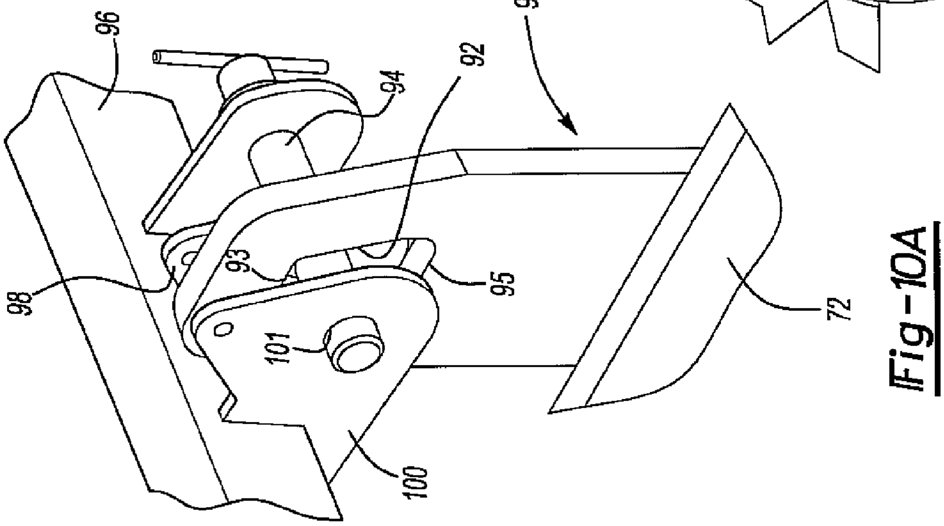
FIG. 10A is an enlarged view of the circled region shown in FIG. 10.
Figure 11:
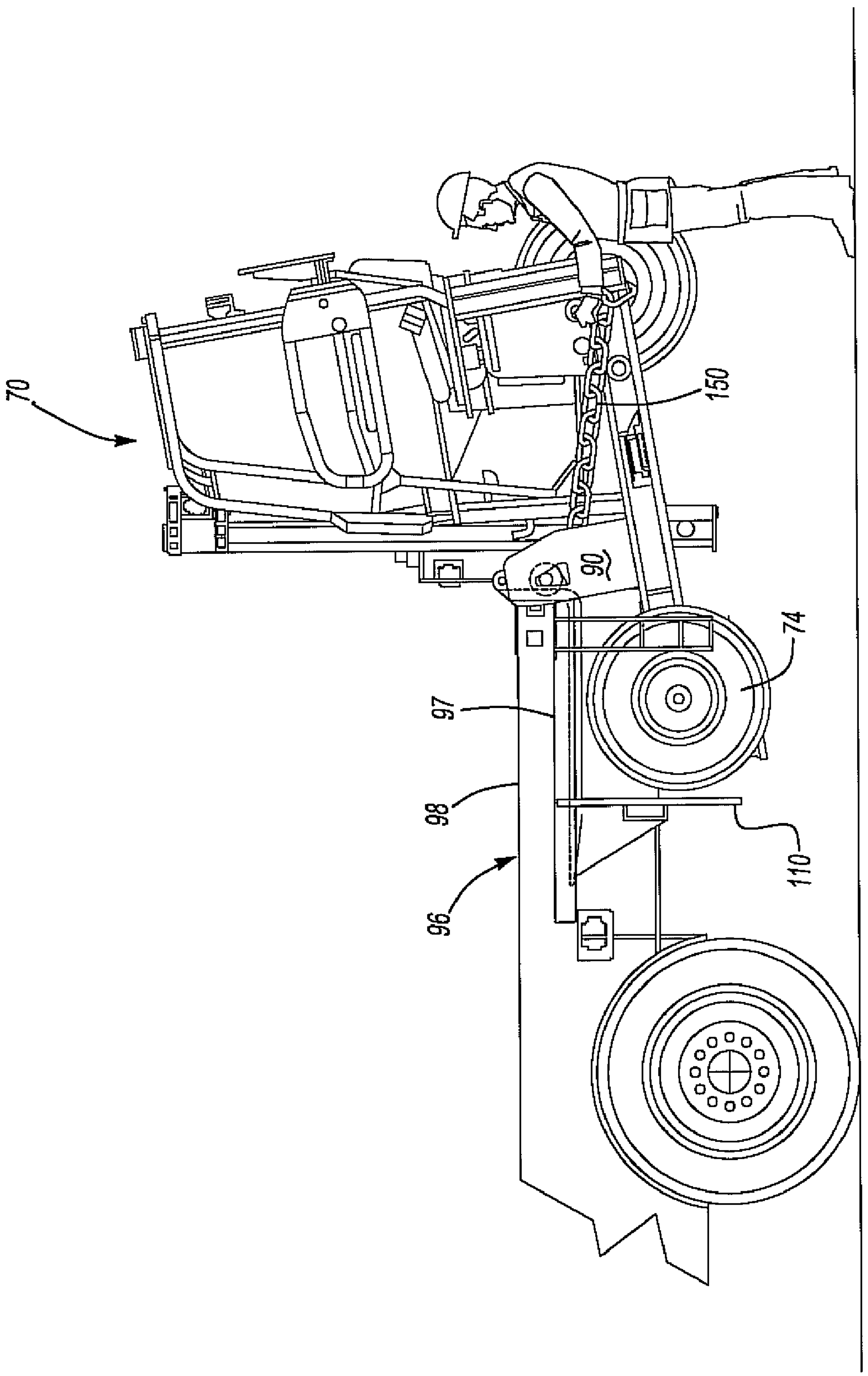
FIG. 11 is a side view of the forklift shown in FIG. 10 illustrating an operator attaching safety chains to the forklift.

In FIGS. 10 and 11, wheel abutment members 110 are provided and shown positioned just forwardly of the front wheels 74. The wheels 74 may contact the wheel abutment members 110 with the forklift 70 in the mounted position, or may only contact the abutment members 110 when the forklift is jostled during transportation. Alternatively, the abutment members 110, which are generally vertically oriented, may be eliminated and instead the wheels may contact an underside 97 of a vehicle bed 98 (see FIG. 11) or other abutment members (not shown) positioned above the wheels. Wheel rests may alternatively or additionally be provided under the wheels, however it is preferred that no wheel rests are provided under the wheels, as this reduces the complexity of the overall mounting system and improves the ground clearance at the rear of the vehicle 96.

In FIG. 11, the operator has exited the operator location and attached safety chains 150 between the vehicle 96 and the forklift 70. In some versions of the method, the operator turns the engine of the forklift off when it is in the position shown in FIG. 10. The operator then exits the forklift 70, inserts the pins 94 into the supporting position, and then deenergizes the hydraulic system by operating a pressure release valve (not shown) that can be accessed from outside the operator position 78. By deenergizing the hydraulic system and/or releasing the pressure, the forklift 70 is allowed to move downwardly until the weight of the forklift 70 is supported by the pins 94. As shown, it is preferred that the mounting brackets 90 have openings 92 that are narrow at the upper edge 93 and widen as they move downwardly towards the lower edge 95 so as to ease the alignment between the mounting brackets 90 and the pins 94. This also causes the forklift 70 to reach a more precise position when the brackets 90 move downwardly relative to the pins 94 in the supporting position, i.e. the narrowing of the openings causes a centering effect. In an alternative embodiment, the brackets 90 with the openings 92 are provided on the vehicle 96 while the pins 94 have supporting positions on the forklift 70. In this case, it is preferred that the openings 92 be narrower at the lower edge 95 than at the upper edge 93 in order to provide the centering effect. In a further alternative, the openings 92 in the brackets 90 are diamond shaped and are therefore narrower at their upper edge 93 and lower edge 95 than in between the edges.

Figure 12:
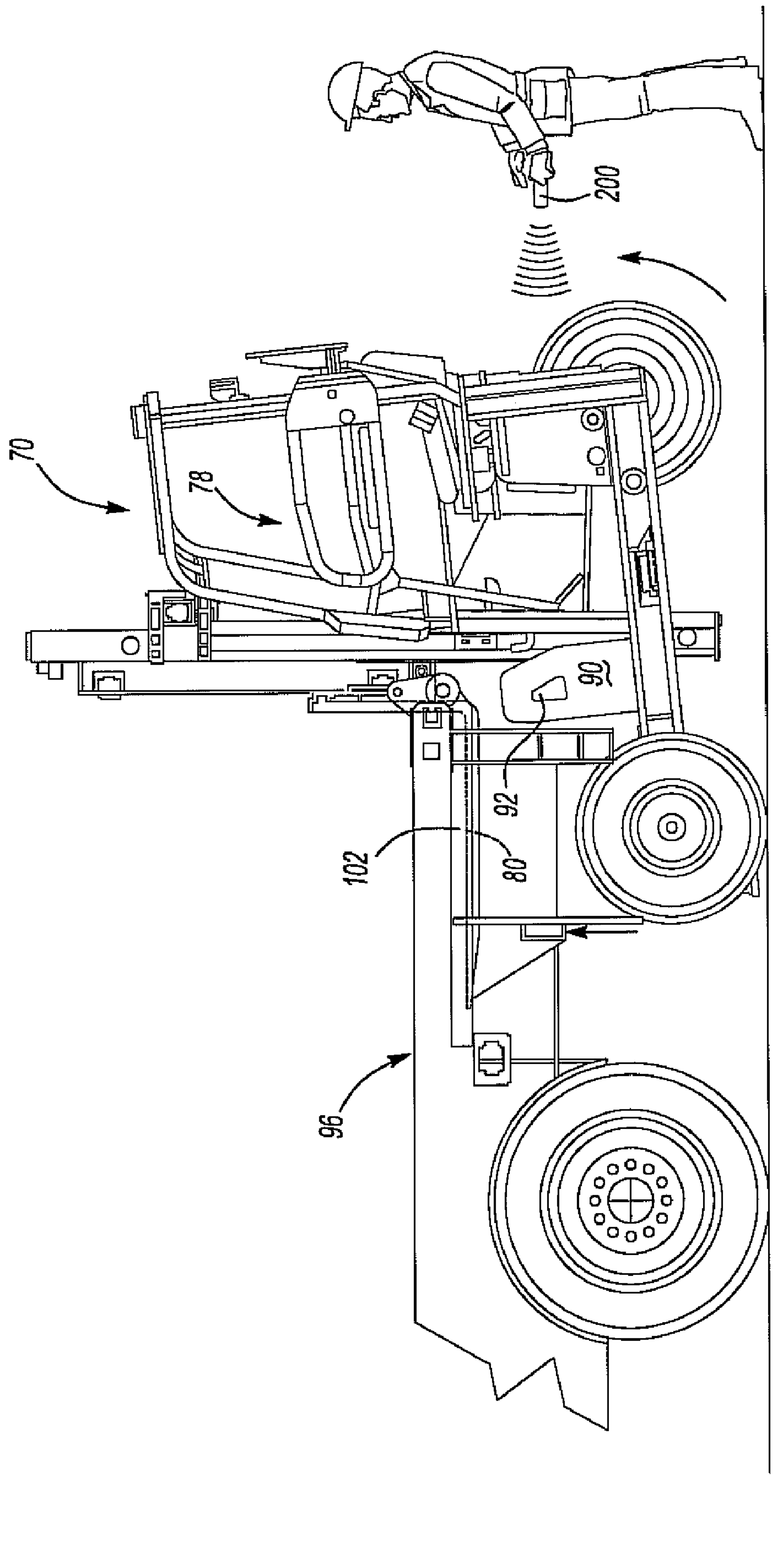
FIG. 12 is a side view of the forklift shown in FIG. 7 with its forks inserted into the fork support on the motor vehicle and the forklift being lifted upwardly using a remote control.

Referring now to FIGS. 6, 7 and 12-15, mounting a forklift to a vehicle using a method according to another embodiment of the invention will be described. Similar to the previous embodiment and as shown in FIG. 6, the operator is in the operator location 78 and the forks 80 are aligned with the fork support 102. With the operator in the operator location 78, the forklift 70 is moved longitudinally forward into the predetermined position shown in FIG. 7. The operator then exits the operator location 78 and the remaining steps are performed without an operator in the operator location 78. For example, FIG. 12 illustrates the operator having exited the operator location 78 and using a remote control 200 to raise the forklift 70 relative to the vehicle 96. In preferred embodiments, the remote control 200 remotely actuates the controls to make use of the standard hydraulic system on the forklift 70, which includes an engine driven pump. For this purpose, the engine is running during these steps and provides full power to the hydraulic system, thereby enabling lifting of the forklift 70. The engine of the forklift 70 may be left running when the operator exits the operator location 78. However, it is preferred that the engine is shut off during the operator exiting the forklift 70, for safety reasons. The engine may then be restarted using auxiliary controls, such as the remote control 200, a secondary ignition switch 210 (see FIG. 15) and the like.

Figure 13:
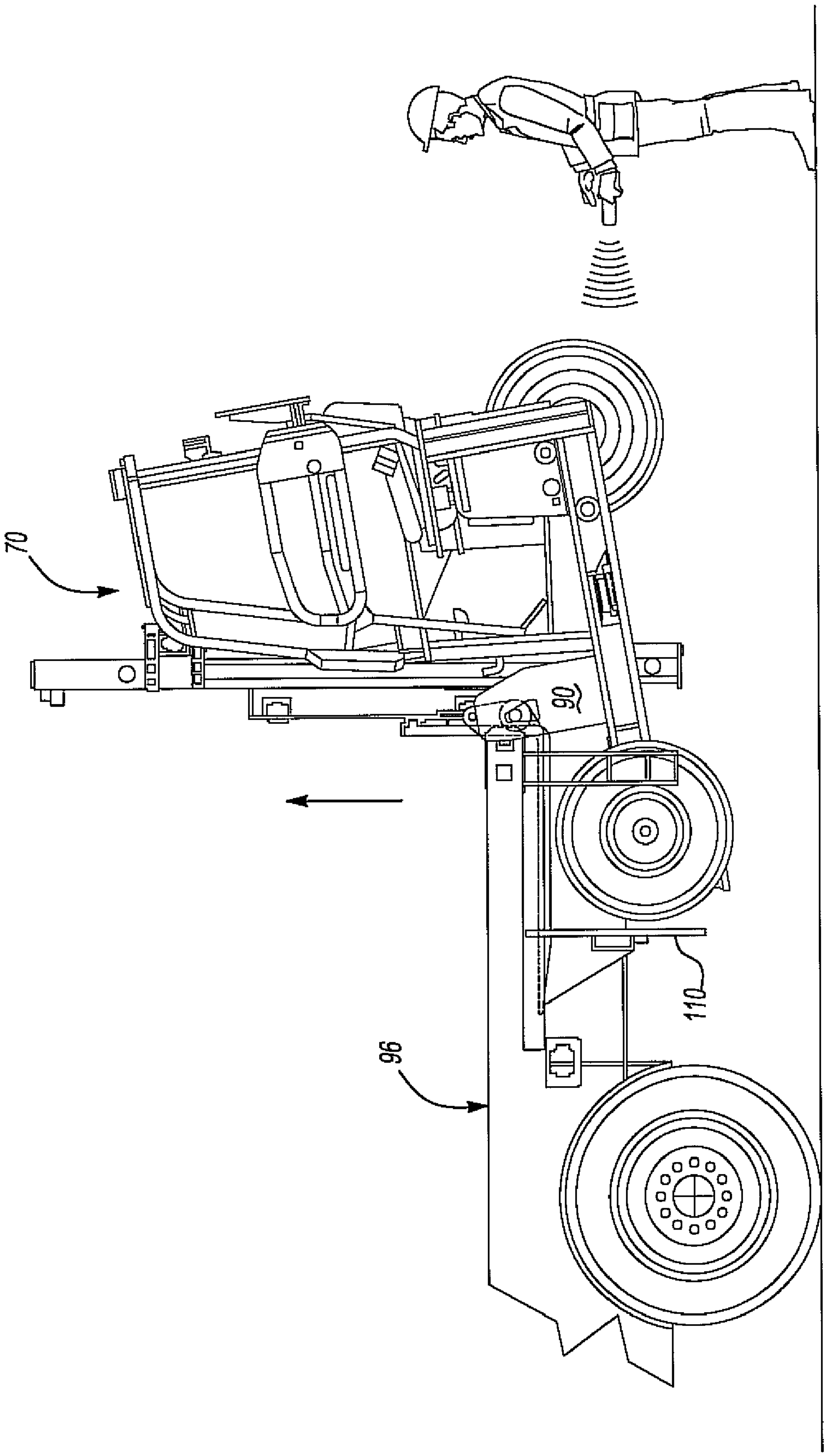
FIG. 13 is the forklift shown in FIG. 12 in an elevated position.
Figure 14:
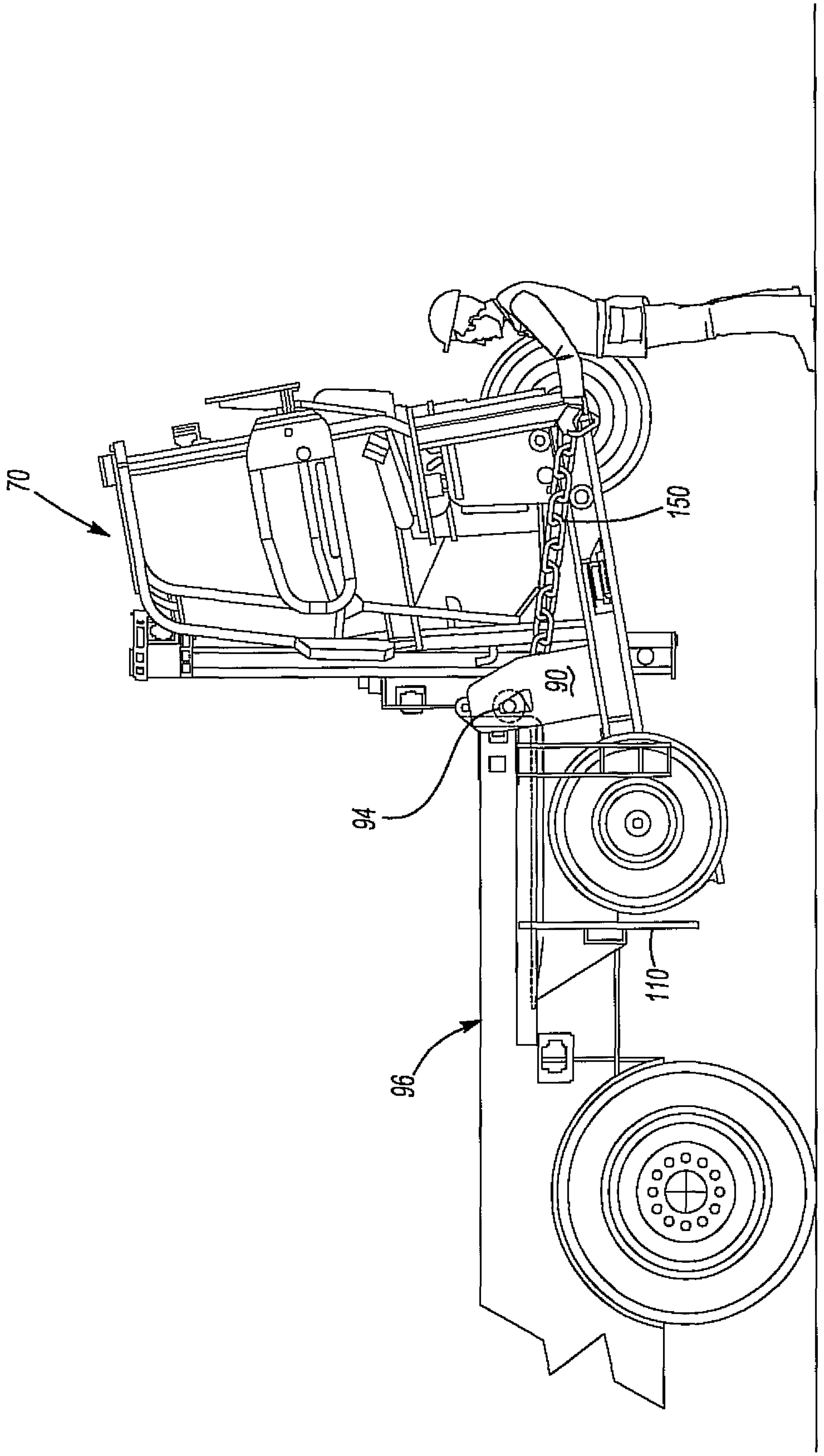
FIG. 14 is the forklift shown in FIG. 13 illustrating an operator attaching safety chains to the forklift.

In FIGS. 12 and 13, the operator uses the remote control 200 to control lifting of the forklift 70 until the openings 92 in the brackets 90 are aligned with the supporting positions of the pins 94 as described above. The operator may then move the pins 94 to the supporting position and then lower the forklift 70 and/or deenergize the hydraulic system such that the weight of the forklift 70 is supported by the mounting system. Safety chains may also be attached as shown in FIG. 14. As with the earlier embodiments, the wheel abutments 110 are shown positioned forwardly of the front wheels 74. As discussed earlier, these may be eliminated with wheel abutments being provided by the underside of the rear of the vehicle 96 or by members placed above the wheels.

As will be clear to those of skill in the art, the process of dismounting the forklift 70 may be performed by performing the steps of either method discussed herein in reverse order. The forklift 70 may be lifted slightly so as to take the load off the receiving pins 94, either with the operator in the operator location 78 or remotely with the operator not in the operator location 78. The pins 94 are then moved to the released position, safety chains may be removed, and then the forklift 70 is lowered until the forklift 70 is supported on the ground. In embodiments where the forklift 70 is raised and lowered with the operator not in the operator location 78, the operator may enter the operator location 78 after the forklift 70 is resting on the ground, thereby reducing the effort required to climb up into the forklift 70.

Figure 15:
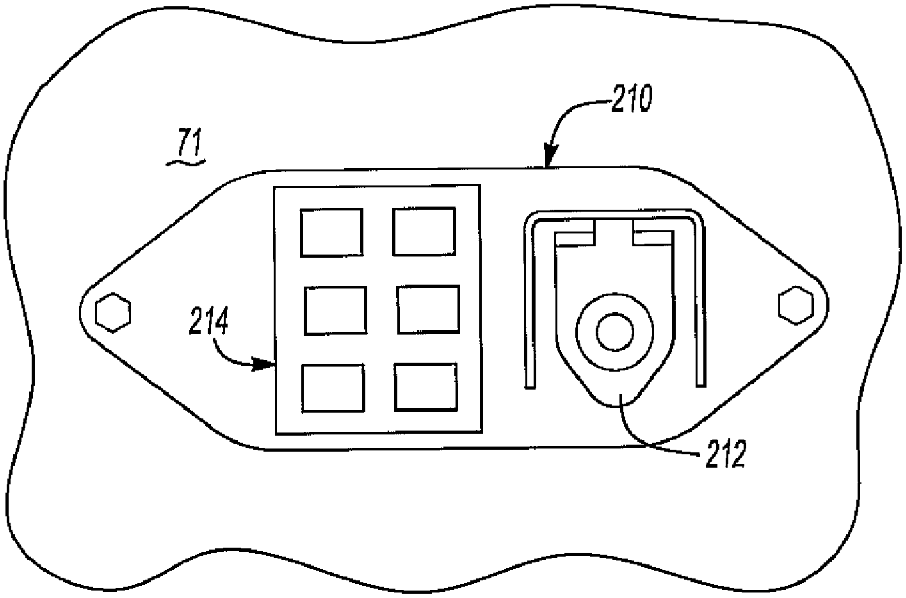
FIG. 15 is an illustration of a secondary ignition switch and a control pad on an external surface of the forklift.
Figure 16:
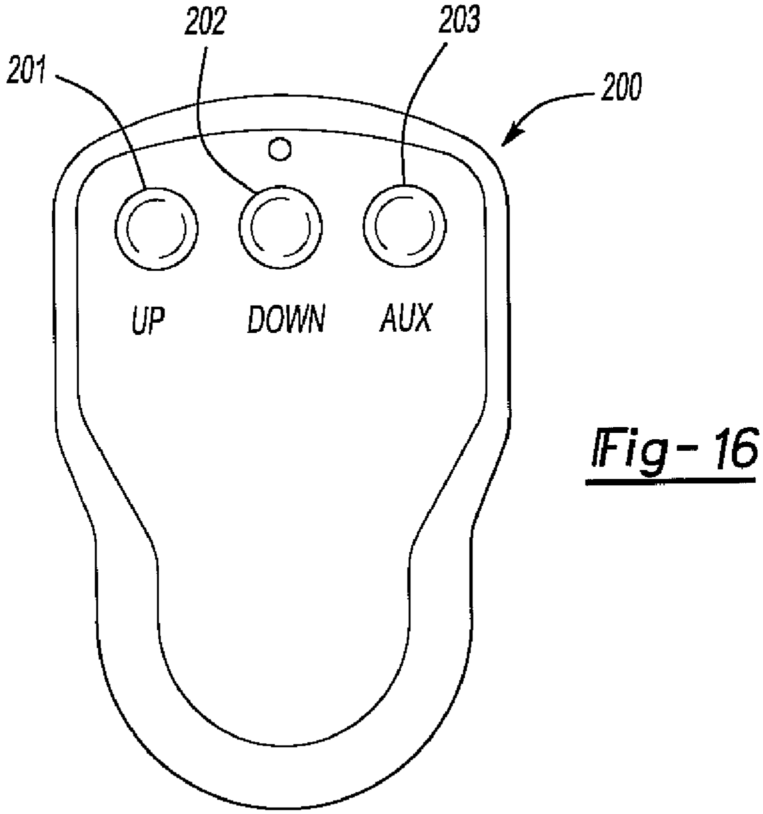
FIG. 16 is an illustration of a remote control.

FIG. 15 illustrates an embodiment of the secondary ignition 210 which may be mounted to an external surface 71 of the forklift 70. The remote ignition 210 includes an ignition key or button (not shown) with a protective cover 212 thereover. FIG. 16 illustrates an embodiment of remote control 200 which may be used for remotely operating the forklift. While the illustrated forklift remote 200 includes only an "UP" button 201 for raising the forklift 70 and a "DOWN" button 202 for lowering the forklift 70, a remote 200 may also be provided that provides for inward and outward longitudinal movement of the forks 80 relative to the forklift 70. For example, the "AUX" button 203 could be programmed to afford for inward and outward longitudinal movement of the forks 80 and/or mast 82 relative to the forklift frame 72. Alternatively, similar controls may be provided that are accessible by the operator from outside the operator location 78, but not in the form of a wireless remote 200. A wired remote (not shown) may be used or a control panel 214 on the external surface 71 of the forklift may be used. In this manner the operator may control upward and downward motion of the forklift 70 as well as inward and outward longitudinal movement of the forks 80 and/or mast 82 and the forklift 70 may be raised and mounted onto a vehicle 96 with an operator not in the operator location 78.

As will be clear to those of skill in the art, the herein described embodiments of the present invention may be altered in various ways without departing from the scope or teaching of the present invention.

We claim:

1. A method of mounting a forklift to a vehicle, the method comprising:

- providing a forklift having a frame with an operator location and operator controls supported thereon, the forklift having a pair of spaced apart front wheels and at least one rear wheel, the forklift also having a pair of forks movably mounted to the forklift frame, the forks being movable in at least a vertical direction relative to the forklift frame;
- providing a vehicle having a rearward end with a fork support for receiving the forks of the forklift;
- providing a mounting system for mounting the forklift to the vehicle, the mounting system comprising:
  - a pair of mounting brackets both fixedly connected to one of the forklift frame or the rearward end of the vehicle, the mounting brackets each having an opening defined therethrough, the opening having a closed perimeter; and
  - a pair of receiving pins, the pins having a supporting position wherein the pins are horizontally disposed and connected to the other of the forklift frame or the rearward end of the vehicle, the pins also having a released position wherein the pins are removed from the supporting position;
- positioning the forklift behind the vehicle and aligning the forks of the forklift with the forklift support at the rearward end of the vehicle;
- moving the forklift toward the rearward end of the vehicle until the forklift reaches a predetermined position adjacent the rearward end of the vehicle and the forks are at least partially disposed in the fork support;
- moving the forks vertically relative to the forklift frame such that the frame of the forklift is lifted upwardly relative to the vehicle until the openings in the mounting brackets are aligned with the supporting position of the pins without substantial longitudinal movement of the frame relative to the vehicle;
- disposing the pins in the supporting position such that the pins are disposed through the openings in the mounting brackets; and
- moving the forks vertically relative to the forklift frame such that the frame is moved downwardly until the pins and mounting brackets cooperate to support the weight of the forklift.

2. The method according to claim 1, further comprising dismounting the forklift from the vehicle, the method further comprising performing the following steps without an operator in the operator location:

- moving the forks vertically relative to the forklift frame such that the frame of the forklift is lifted upwardly relative to the vehicle until the forklift is supported by the forks and is not supported by the cooperating pins and mounting brackets;
- disposing the pins in the released position such that the pins are not disposed through the openings in the mounting brackets; and
- moving the forks vertically relative to the forklift frame such that the frame is moved downwardly until the wheels of the forklift are supported by the ground.

3. The method according to claim 1, wherein when the forklift is disposed in the predetermined position adjacent the rearward end of the vehicle and the openings in the brackets are substantially longitudinally aligned with the supporting positions of the pins such that the step of moving the forks vertically until the mounting brackets are aligned with the supporting positions requires substantially no longitudinal movement of the forks relative to the frame.

4. The method according to claim 1, further including providing an engine driven pump for a hydraulic system operable to vertically move the forks with respect to the frame.

5. The method according to claim 4, wherein moving the forks vertically to move the forklift frame downwardly comprises deenergizing the hydraulic system.

6. The method according to claim 1, wherein the forks of the forklift are further movable longitudinally relative to the frame between a back position and a forward position, the predetermined position of the forklift comprising the forks being in or adjacent the back position.

7. The method according to claim 1, wherein the openings in the mounting brackets have a vertical dimension substantially greater than a vertical dimension of the pins.

8. The method according to claim 7, wherein the mounting brackets are fixedly connected to the frame of the forklift and the pins in the supporting position are connected to the vehicle, the openings in the brackets having an upper limit and a lower limit, the openings being narrower at the upper limit than the lower limit.

9. The method according to claim 1, wherein the fork support comprises a pair of fork receiving pockets.

10. The method according to claim 1, wherein the fork support comprises at least one upper support member and one lower support member, each member extending generally longitudinally, the forks being received above the lower support member and below the upper support member.

11. The method according to claim 1, wherein the brackets are generally planar members each disposed in a plane that is parallel to a longitudinal axis of the forklift.

12. The method according to claim 1, wherein the mounting system further includes two pairs of flanges, one pair of flanges supporting each of the pins in the supporting position.

13. The method according to claim 12, wherein each flange has an aperture defined therein, the pins being received in the apertures.

14. The method according to claim 1, wherein the forks of the forklift are further movable in a longitudinal direction relative to the frame of the forklift.

15. The method according to claim 1, further including providing an abutment surface on the vehicle and above one of the front wheels of the forklift when the forklift is mounted to the rear of the vehicle.

16. The method according to claim 1, further comprising the step of providing an auxiliary controller.

17. The method according to claim 16, wherein:

the auxiliary controller is selected from the group consisting of a wireless remote controller and a wire remote controller; and at least one of the moving steps comprises using the auxiliary controller to remotely operate the operator controls of the forklift.

18. The method according to claim 16, wherein the auxiliary controller is operable to move the forks of the forklift in a vertical and/or longitudinal direction.

19. A method of mounting a forklift to a vehicle, the method comprising:

providing a forklift having a frame with an operator location and operator controls supported thereon, the forklift having a pair of spaced apart front wheels and at least one rear wheel, the forklift having a pair of forks movably mounted to the forklift frame, the forks being movable in at least a vertical direction relative to the forklift frame;

providing a vehicle having a rearward end with a fork support for receiving the forks of the forklift;

providing a mounting system for mounting the forklift to the vehicle, the mounting system comprising:

a pair of mounting brackets both fixedly connected to one of the forklift frame or the rearward end of the vehicle, the mounting brackets each having an opening defined therethrough, the opening having a closed perimeter; and a pair of receiving pins, the pins having a supporting position wherein the pins are horizontally disposed and connected to the other of the forklift frame or the rearward end of the vehicle, the pins also having a released position wherein the pins are removed from the supporting position;

performing the following steps with an operator in the operator location:

positioning the forklift behind the vehicle and aligning the forks of the forklift with the forklift support at the rearward end of the vehicle;

moving the forklift toward the rearward end of the vehicle until the forklift reaches a predetermined position adjacent the rearward end of the vehicle and the forks are at least partially disposed in the fork support;

performing the following steps without an operator in the operator location:

moving the forks vertically relative to the forklift frame such that the frame of the forklift is lifted upwardly relative to the vehicle until the openings in the mounting brackets are aligned with the supporting position of the pins without substantial longitudinal movement of the frame relative to the vehicle;

disposing the pins in the supporting position such that the pins are disposed through the openings in the mounting brackets; and moving the forks vertically relative to the forklift frame such that the frame is moved downwardly until the pins and mounting brackets cooperate to support the weight of the forklift.

* * * * *